July 4, 1939.                M. F. WATERS                2,165,164
                         FLEXIBLE PIPE COUPLING
                          Filed May 5, 1938            2 Sheets-Sheet 1

Inventor
M. F. Waters,

Attorneys

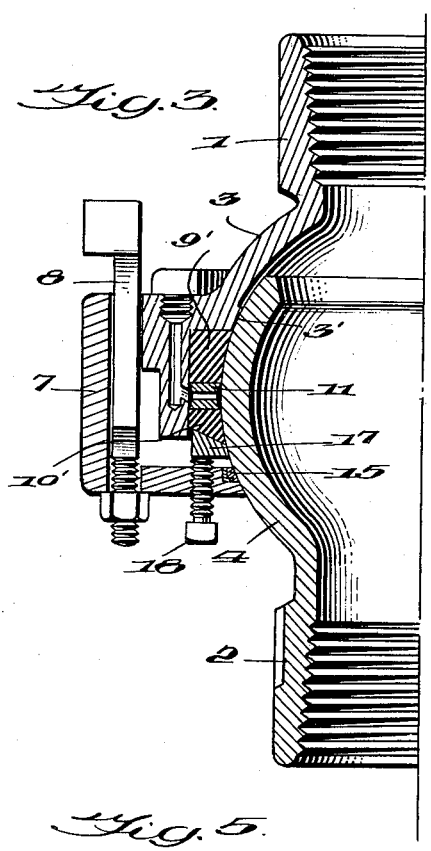
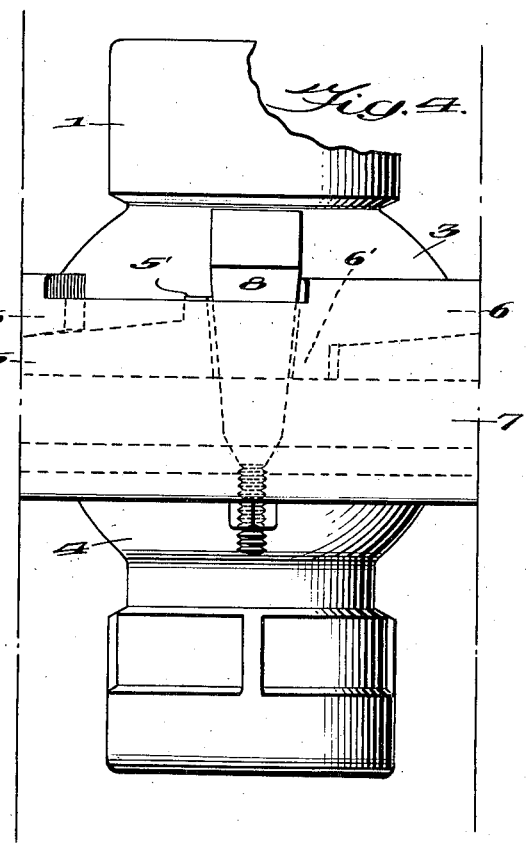
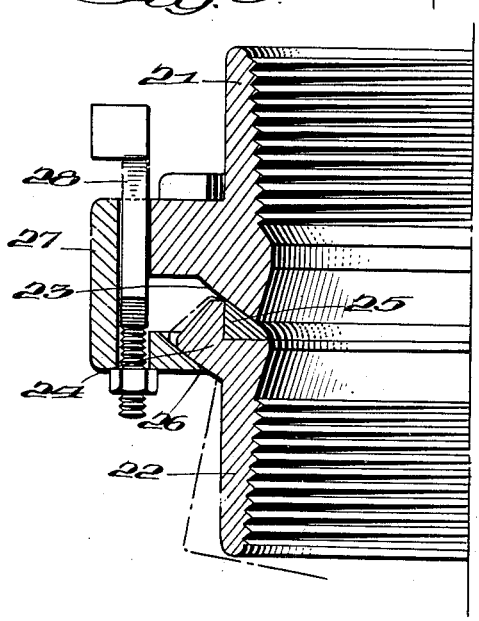
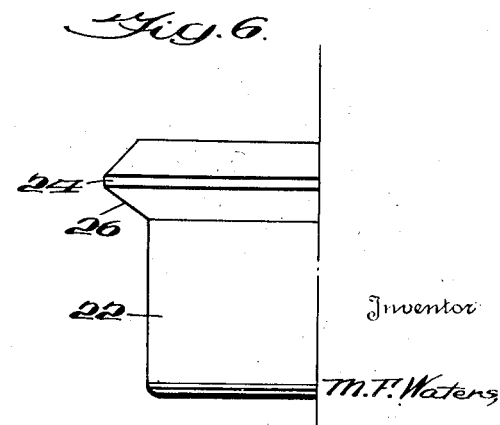

Patented July 4, 1939

2,165,164

UNITED STATES PATENT OFFICE 2,165,164

FLEXIBLE PIPE COUPLING

Millard F. Waters, Tulsa, Okla., assignor to Hanlon-Waters, Inc., Tulsa, Okla

Application May 5, 1938, Serial No. 206,283

2 Claims. (Cl. 285—91)

My invention consists in new and useful improvements in flexible pipe couplings and has for its object to provide a device of this character whereby the union of two pipe sections may be effected in a simple and rapid operation without employing the usual bolts and nuts.

I am familiar with the various conventional flexible pipe couplings but in all instances which have come to my attention, the sections are secured together either by the use of bolts and nuts or by the ordinary screw thimble arrangement. With the bolted types of couplings, it is not always convenient to locate the locking bolts and nuts at the most available position on the coupling, and with the screw thimble type, it is often found difficult to apply a wrench or tool to the coupling because of some obstruction such as another pipe or adjacent piece of equipment. It is therefore a further object of my invention to provide a flexible pipe coupling employing a single locking device which may be applied at various positions, thereby avoiding the disadvantages above noted.

Another object of my invention is to provide a flexible coupling which is devoid of projecting ears and anchoring abutments and wherein the locking is effected by a wedge action entirely within the confines of the coupling.

A further object of my invention is to provide a flexible coupling employing two opposed series of wedging lugs which are forced into wedging engagement by a single wedge lock member adapted to apply a wedging force directly behind any selected pair of opposed wedging lugs.

With the above and other objects in view which will appear as the description proceeds, my invention resides in the novel features hereinafter set forth, illustrated in the accompanying drawings and more particularly pointed out in the appended claims.

Referring to the drawings in which numerals of like character designate similar parts throughout the several views, Fig. 1 is a view partially in side elevation and partially in section, showing one form of my invention adapted to a ball and socket joint.

Fig. 3 is a fragmentary section similar to Fig. 1 but showing a modified form of sealing means.

Fig. 4 is a partial view in side elevation taken at right angles to Fig. 1.

Fig. 5 shows a modification of my invention adapted to a flexible joint, and

Fig. 6 is a partial detail of one of the coupling sections of Fig. 5.

Figure 1:
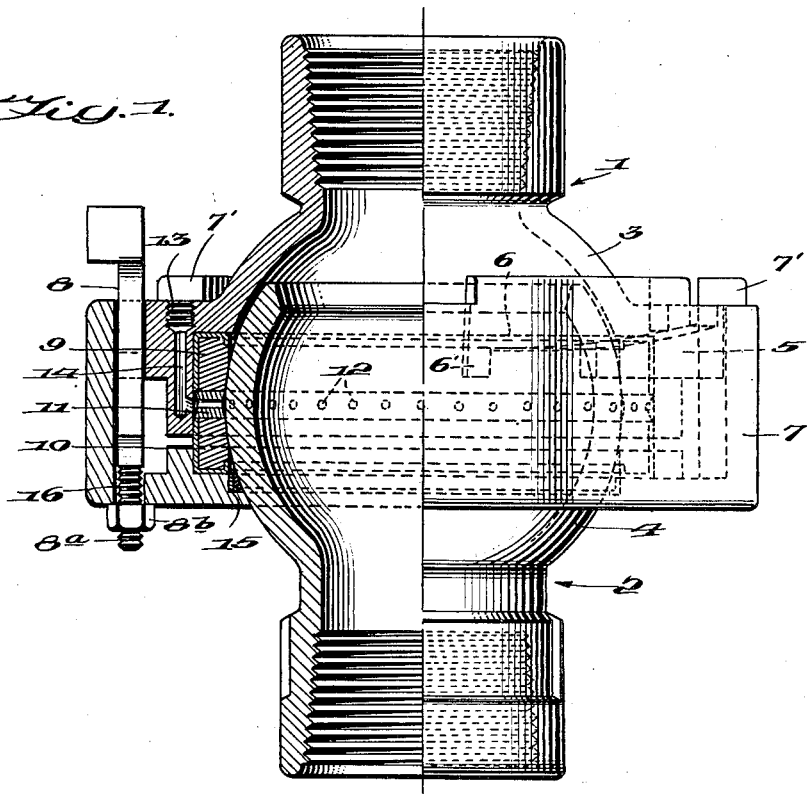
Figure 2:
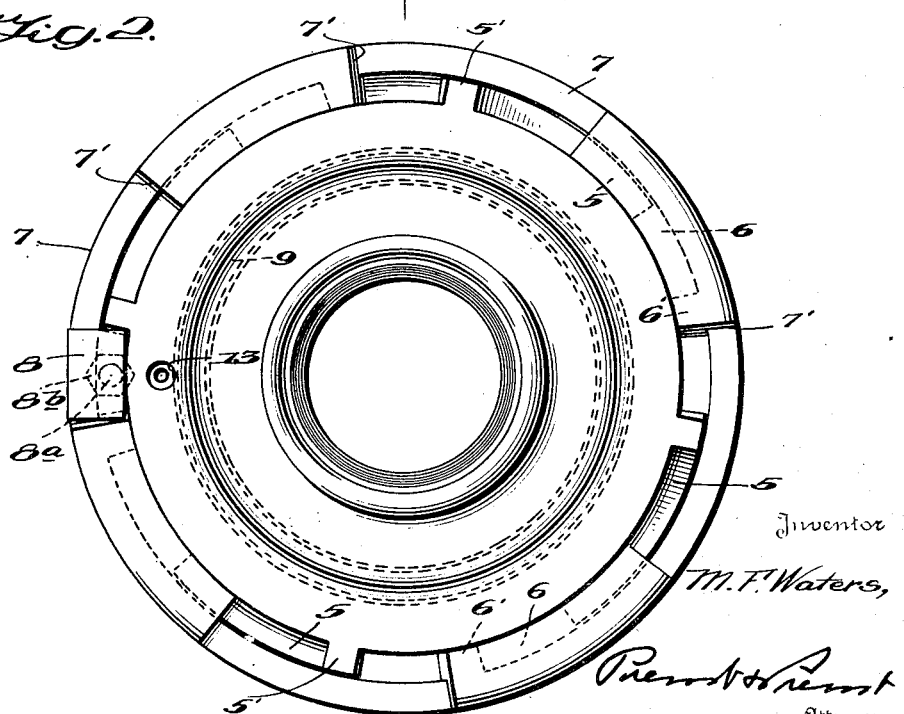
Fig. 2 is a top plan view of the same.

In the drawings, referring to Figs. 1 to 4, numerals 1 and 2 represent a pair of coupling sections internally threaded at their outer ends to receive the complementary threads of two sections of pipes to be secured together. The section 1 terminates at its lower end in an enlarged socket portion 3 adapted to receive the upper end of the ball portion 4 formed on the coupling section 2. The socket portion 3 is thickened at its lower extremity which carries a series of outwardly projecting peripheral wedge lugs 5 spaced at predetermined intervals and adapted to cooperate with a complementary series of inwardly projecting opposed wedge lugs 6 carried on the inner periphery of an annular coupling collar 7. The top edges of lugs 6 project above the upper rim of the collar 7 so as to form shoulders 7', whereby the collar may be initially rotated in either direction by striking any of said shoulders with a hammer or other intrument.

The coupling collar 7 is open at its upper end to receive the socket portion of coupling section 1 and has a reduced opening at its lower extremity to embrace the periphery of the ball portion 4 of section 2, as clearly shown in Fig. 1, the wedge lugs 6 being so spaced on the inner periphery of the coupling collar as to accommodate the complementary lugs 5 on the coupling section 1. The flaring end of each of the lugs 5 and 6 terminates in a vertically inclined elongated abutment 5' and 6', respectively, which are adapted to serve as opposed wedging surfaces for a wedge lock device 8 hereinafter described. In the form shown in the drawings, the abutments 5' extend upwardly beyond the flaring edge of lugs 5, and the abutments 6' extend downwardly in a like manner, the complementary wedge lugs being oppositely disposed in all respects.

In Fig. 1 I have shown one form of sealing means for my improved coupling including upper and lower sealing rings 9 and 10, respectively, each of which is composed of any suitable packing material preferably encased in a thin strip of metal which extends over one edge and one side of each ring, said rings being spaced apart by a metal grease ring 11 and fitting in suitable recesses in the inner walls of the socket member 3 and the coupling collar 7, as clearly shown in the drawings. The grease ring 11 is preferably grooved at least around its outer periphery and provided with a series of radial lubricating openings 12, the socket member 3 being drilled and threaded for an alemite fitting as at 13, such opening being in communication with the peripheral groove of the ring 11 by means of a grease cavity 14.

I may also provide an additional sealing ring 15 preferably of soft metal immediately adjacent the reduced opening in the coupling collar 7 which embraces the ball portion 4 of the coupling section 2. This ring is used simply as a precaution and acts to support some of the weight and strain of the coupling section 2 when the structure is assembled.

The form of coupling shown in Fig. 1 is assembled by first inserting the threaded end of section 2 through the reduced opening in the collar 7 so that the ball portion 4 thereof rests upon the ring 15, the lower sealing ring 10 having been inserted in its recess on the collar. The socket portion 3 of the upper coupling section 1 with the sealing ring 9 and grease ring 11 are then slipped over the upper end of the ball 4, the wedge lugs 5 slipping between the complementary lugs 6 of the collar 7. A slight turn of the collar 7 to the right in Figs. 1 and 4 brings the opposed wedging surfaces of the complementary sets of lugs into wedging engagement and separates the abutments 5' and 6' sufficiently to permit the insertion of a wedge lock 8 as shown in Fig. 4.

In line with each abutment 6', the lower edge of the coupling collar 7 is provided with a guide opening 16 adapted to receive the threaded lower end 8a of the wedge lock 8. Thus, the wedge lock 8 may be inserted between the most convenient pair of opposed abutments 5' and 6' and as it is forced downwardly, the abutments are further separated and the wedging surfaces of the complementary lugs 5 and 6 brought into tighter engagement. This naturally brings the bottom of the coupling collar 7 and the socket portion of coupling section 1 into closer engagement and compresses the packing rings 9 and 10, forcing the inner surfaces thereof tightly against the periphery of the ball portion 4.

The wedge lock 8 may be forced into its wedging action by tapping the head thereof with a hammer or suitable instrument, the application of a nut 8b to the threaded end 8a of said wedge lock retaining the same in place. The wedge lock may be further forced inwardly by tightening the nut 8b from time to time if necessary.

After the coupling is assembled, an alemite gun may be applied to a fitting in opening 13 on the socket portion 3 and grease injected under pressure into the cavity 14, from whence it is distributed by the grease ring 11 around the ball portion 4, thus insuring a tight coupling, the sections of which are capable of a considerable relative movement in any lateral direction.

In Fig. 3 I have shown a coupling practically identical with the one just described with the exception of the packing arrangement. In this modified form, the packing rings 9' and 10' are composed of any suitable packing material and formed with their inner faces of a contour which conforms to the periphery of the ball portion 4 of the lower coupling section 2. In order to accommodate the flaring upper edge of the ring 9', the inner wall of the socket portion 3 on the upper coupling section 1 is extended inwardly to form an annular shoulder 3'. A grease ring 11 separates the two packing rings as in the other form, and the underside of the lower packing ring 10' is beveled to correspond with the upper beveled surface of a metal follower ring 17 supported on its underside by a series of auxiliary take-up screws 18 spaced around the bottom wall of the coupling collar 7.

Thus, with this form of coupling, the take-up screws may be initially set and the coupling sections and packing rings tightened by the wedging of the lugs and wedge lock as described above. Then, if it becomes necessary, the packing rings 9' and 10' may be further tightened from time to time by screwing the take-up screws 18 against the follower ring 17 without disturbing the wedge lock 8.

A still further modification or adaptation of the basic principle of my invention is illustrated in Fig. 5 and comprises upper and lower coupling sections 21 and 22, respectively, both of which are internally threaded at their outer ends to accommodate the threads of sections of pipe to be coupled. The lower extremity of the upper coupling section 21 terminates in a thickened annular base, the outer face of which is rounded as at 23. The lower coupling section 22 terminates at its upper end in an outwardly flaring shoulder 24, the upper inner edge of which is recessed to receive a packing ring 25. The exposed face of this ring is concave to conform to the shape of the rounded face 23 on the base of the upper coupling section 21. The lower surface of the shoulder 24 is also rounded as at 26 to fit a complementary rounded surface adjacent the opening in the bottom of a coupling collar 27.

The coupling collar 27 and the upper coupling section 21 are provided with cooperating wedge lugs similar in all respects to those shown in Figs. 1 and 4, and as in those forms, this coupling is assembled and locked by a wedge lock 28.

Thus, when this coupling is assembled, the sections are capable of a relative movement as shown in dotted lines in Fig. 5, due to the cooperating rounded surfaces of the shoulder 24, the packing ring 25, and the adjacent faces of the upper section 21 and the coupling collar 27.

It will be apparent that a coupling constructed in accordance with either of the forms of my invention above described may be readily and rapidly assembled and disassembled simply by the application of or removal of a single wedge lock followed by a slight turn of the coupling collar, thus avoiding the necessity of screwing and unscrewing numerous bolts and nuts. Furthermore, all forms of the invention possess the distinct advantage of enabling an operator to apply the single wedge lock at any convenient position on the coupling. Regardless of the position at which the wedge lock is inserted, the wedging force is applied directly behind the wedge lugs, thereby insuring a maximum of wedging force without torque and strain on projecting ears or abutments.

From the foregoing it is believed that the construction and advantages of my improved flexible pipe couplings may be readily understood by those skilled in the art without further description, it being borne in mind that numerous changes may be made in the details disclosed without departing from the spirit of my invention as set out in the following claims.

What I claim and desire to secure by Letters Patent is:

1. A flexible pipe coupling including a pair of coupling sections, an annular concave socket member on one end of one section, an annular convex member on the adjacent end of the other section adapted to seat within said socket member and capable of lateral movement with respect thereto, a coupling collar adapted to embrace said sections, concave means on said collar for engaging a complementary portion on one of said sections, outwardly projecting wedging lugs on the periphery of the other of said sections, oppositely disposed complementary wedging lugs on the inner periphery of said collar cooperating with said first named lugs upon the rotation of said collar, opposed abutments on the flaring ends of the respective lugs, and means for applying a rotational force directly behind selected wedging lugs, comprising a tightening wedge interposed between the respective opposed abutments.

2. In a ball and socket pipe coupling, means for coupling the sections thereof together, including a coupling collar adapted to embrace said sections, a pair of packing rings in a recessed portion of the socket section of said pipe coupling adapted to embrace the adjacent surface of the ball section of said coupling, a grease ring interposed between said pair of packing rings, said grease ring being provided with a series of communicating radial ports terminating in communication with the periphery of said ball section, means for supplying grease to said grease ring, means on said collar for engaging the ball section of said coupling, outwardly projecting wedging lugs on the periphery of the socket section of said coupling, oppositely disposed complementary wedging lugs on the inner periphery of said collar cooperating with said first named lugs upon the rotation of said collar, opposed abutments on the flaring ends of the respective lugs, and means for applying a rotational force directly behind selected wedging lugs for bringing said sections into close engagement and simultaneously compressing said packing rings, comprising a tightening wedge interposed between the respective opposed abutments.

MILLARD F. WATERS.